United States Patent [19]

Nakamura et al.

[11] Patent Number: 5,141,679
[45] Date of Patent: Aug. 25, 1992

[54] OILY DROPLET OF HYDROPHOBIC MATERIAL, MICROCAPSULE, AND PROCESSES FOR PREPARING THE SAME

[75] Inventors: Taku Nakamura; Masakazu Yoneyama, both of Kanagawa, Japan

[73] Assignee: Fuji Photo Film Co., Ltd., Kanagawa, Japan

[21] Appl. No.: 444,254

[22] Filed: Dec. 1, 1989

[30] Foreign Application Priority Data

Dec. 2, 1988 [JP] Japan ................................ 63-306433

[51] Int. Cl.⁵ ......................... B01J 13/16; B01J 13/02
[52] U.S. Cl. ................................ 264/4.7; 428/402.22; 264/4.32; 264/4.33; 430/138; 503/215
[58] Field of Search ...................... 264/4.7, 4.32, 4.33; 428/402.22

[56] References Cited

U.S. PATENT DOCUMENTS

| | | | |
|---|---|---|---|
| 4,059,552 | 11/1977 | Zweigle et al. | 524/555 |
| 4,294,921 | 10/1981 | Yamaguchi et al. | 264/4.4 X |
| 4,746,467 | 5/1988 | Sakamoto et al. | 264/4.7 |
| 4,842,978 | 6/1989 | Ishikawa | 264/4.7 X |
| 4,977,059 | 12/1990 | Liang et al. | 264/4.7 X |

FOREIGN PATENT DOCUMENTS 2590185  5/1987  France .
55-121883  12/1980  Japan .

OTHER PUBLICATIONS

Patent Abstracts of Japan, vol. 4, No. 182 (C-35) [664], Dec. 16, 1980.

Primary Examiner—Robert L. Stoll
Assistant Examiner—John M. Covert
Attorney, Agent, or Firm—Sughrue, Mion, Zinn, Macpeak & Seas

[57] ABSTRACT

Disclosed are oily droplets comprising an oily core containing a compound having an ethylenically unsaturated group and a film formed around the oily core which is composed of a reaction product of the compound having an ethylenically unsaturated group with a water-soluble polymer having a sulfinyl group. Also disclosed are microcapsules comprising the oily droplet and a resin wall formed therearound. Further disclosed are processes for preparing the oily droplets and the microcapsules.

12 Claims, No Drawings

OILY DROPLET OF HYDROPHOBIC MATERIAL, MICROCAPSULE, AND PROCESSES FOR PREPARING THE SAME

FIELD OF THE INVENTION

The present invention relates to oily droplets of a hydrophobic material, microcapsules and processes for preparing the oily droplets and the microcapsules.

BACKGROUND OF THE INVENTION

Techniques for dispersing and emulsifying water insoluble compounds in an aqueous medium to use as an emulsion have been recently paid much attention in various fields such as fields of recording materials, pharmaceuticals, aromatics, agricultural chemicals, adhesives, foods and cosmetics. Particularly, there have been desired stable emulsions which are almost free from coalescence of contents or precipitation thereof even when exposed to variations of temperatures and pH or subjected to dilution or freezing.

For enhancing stability of emulsions, a variety of methods are known, for example, a method of adjusting the density of dispersed hydrophobic material (oily liquid) to that of the aqueous medium, a method of using an appropriate surface active agent, and a method of using a water-soluble polymer known as a protective colloid (e.g, polyvinyl alcohol, polyvinyl pyrrolidone, and polyvinylbenzene sodium sulfonate which is described in Japanese Patent Provisional Publication No. 56(1981)-51238). However, those methods can hardly stabilize an emulsion containing oily droplets having relatively larger diameters such as a diameter of 1 to 20 μm, although they are effective for emulsions containing oily droplets having a diameter of smaller than 1 μm.

SUMMARY OF THE INVENTION

It is an object of the present invention to provide stable oily droplets of a hydrophobic material having a diameter of 1 to 20 μm which are almost free from coalescence with other droplets, a process for preparing the oily droplets, microcapsules comprising the oily droplet and a shell wall formed therearound, and a process for preparing the microcapsules.

Particularly, the object of the invention is to provide oily droplets of a hydrophobic material whose dispersibility can be stably kept even under the condition of high temperatures and which are advantageously employable for preparing microcapsules, and a process for preparing the oily droplets.

There is provided by the invention oily droplets of a hydrophobic material comprising an oily core of a hydrophobic material containing a compound having an ethylenically unsaturated group and a film formed therearound which is composed of a reaction product of the compound having an ethylenically unsaturated group with a water-soluble polymer having a sulfinyl group.

There is also provided by the invention a process for preparing the above oily droplets comprising dispersing a hydrophobic material containing an ethylenically unsaturated group in the form of oily droplets in an aqueous medium containing a water-soluble polymer having a sulfinyl group to form a film of a reaction product of the compound having an ethylenically unsaturated group with the water-soluble polymer having a sulfinyl group around the oily droplet.

There is further provided by the invention microcapsules comprising an oily droplet of a hydrophobic material containing a compound having an ethylenically unsaturated group, a film formed around the oily droplet which is composed of a reaction product of the compound having an ethylenically unsaturated group with a water-soluble polymer having a sulfinyl group, and a resin wall formed on the film which is composed of a polymer of a high-molecular compound.

There is still further provided by the invention a process for preparing the above microcapsules comprising the steps of dispersing a hydrophobic material containing compound having an ethylenically unsaturated group in the form of oily droplets in an aqueous medium containing a water-soluble polymer having a sulfinyl group to form a film of a reaction product of the compound having an ethylenically unsaturated group with the water-soluble polymer having a sulfinyl group around the oily droplet, and forming a resin wall on the film which is composed of a polymer of a high-molecular compound.

According to the process of the invention, a sulfinyl group of the water-soluble polymer is caused to react with an ethylenically unsaturated group contained in the hydrophobic material (Michael addition reaction), to form a thin film of a reaction product on a surface of the oily droplet of the hydrophobic material. The thin film of the reaction product inhibits coalescence of the droplets even when the droplets are brought into contact with each other, whereby droplets of larger diameters cannot be formed. Further, the sulfinyl acid which does not participate in the above reaction exists on the surface of the oily droplet to give anionic charge repulsion, and thereby the coalescence of the oily droplets can be also prevented. Moreover, the water-soluble polymer serves as a protective colloid for the droplets of the hydrophobic material.

Accordingly, there can be obtained a dispersion homogeneously containing oily droplets each having a thin film and having a diameter of 1 to 20 μm (preferably 5 to 15 μm). The dispersion is very stable even under the condition of high temperatures and can be advantageously employed for the preparation of microcapsules.

DETAILED DESCRIPTION OF THE INVENTION

A dispersion of the oily droplets each having a thin film according to the invention can be prepared by introducing a hydrophobic material containing a compound having an ethylenically unsaturated group into an aqueous medium containing a water-soluble polymer having a sulfinyl group, and dispersing or emulsifying the hydrophobic material in the aqueous medium at a temperature ranging from room temperature (20° C.) to approx. 35° C. Through the dispersing procedure, the aforementioned Michael addition reaction occurs on the surface of the oily droplet of the hydrophobic material in the aqueous medium, to form a thin film around the oily droplet.

The water-soluble polymer having a sulfinyl group which can be employed in the invention has the formula (I):

  (I)

in which A is a repeated unit derived from an ethylenically unsaturated monomer having a sulfinyl group, B is a repeated unit derived from an ethylenically unsaturated monomer not having a sulfinyl group, each of x and y indicates percentage by mol of each monomer, x is in the range of 0.1 to 100 mol %, and y is in the range of 0 to 99.9 mol %.

Examples of the ethylenically unsaturated monomers having a sulfinyl group include sodium vinylbenzenesulfinate, potassium vinylbenzenesulfinate, sodium N-acryloyl-N-methylaminobenzenesulfinate, sodium allylsulfinate and ammonium vinylbenzene sulfinate. Preferably employed in the invention are sodium vinylbenzenesulfinate, potassium vinylbenzenesulfinate and ammonium vinylbenzenesulfinate.

Examples of the ethylenically unsaturated monomers not having a sulfinyl group include acrylic acid, salts thereof, methacrylic acid, salts thereof, acrylic esters, methacrylic esters, maleic monoesters, maleic diesters, itaconic monoesters, itaconic diesters, acrylamides, methacrylamides, N-vinyl compounds, styrene derivatives, and hetero rings having a vinyl group. Among them, preferred are acrylic esters, methacrylic esters, acrylamides, N-vinyl compounds and styrene derivatives.

Concrete examples of the acrylic esters include butyl acrylate, 2-ethylhexyl acrylate, hydroxyethyl acrylate and methoxyethoxy acrylate. Concrete examples of the methacrylic esters include methyl methacrylate, butyl methacrylate, hydroxyethyl methacrylate and benzyl methacrylate. Concrete examples of the acrylamides include acrylamide, N-acryloylmorpholine, N,N-dimethylacrylamide, 2-acrylamide-2-methylpropane sodium sulfonate, diacetone acrylamide and N-methylolacrylamide. Concrete examples of the N-vinyl compounds include N-vinylpyrrolidone, N-vinyl-succinimide and N-vinylacetamide. Concrete examples of the styrene derivatives include styrene, vinyltoluene, sodium vinylbenzenesulfonate and sodium vinylbenzenecarboxylate.

Examples of the water-soluble polymers having a sulfinyl group which can be preferably employed in the invention are as follows.

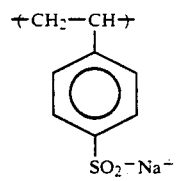 (P-1)

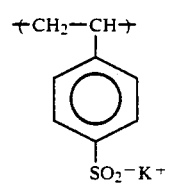 (P-2)

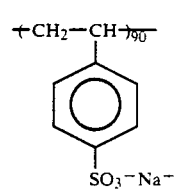 (P-3)

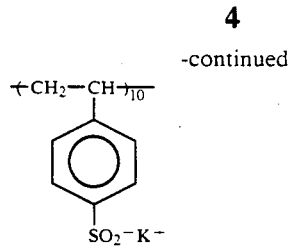

 (P-4)

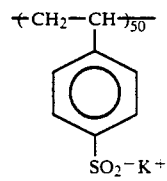

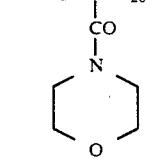 (P-5)

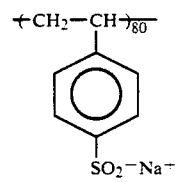

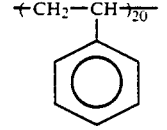 (P-6)

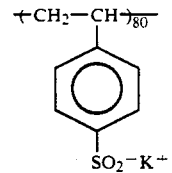

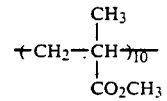 (P-7)

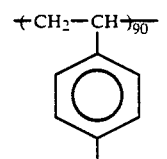

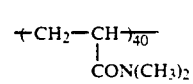 (P-8)

-continued

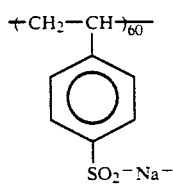

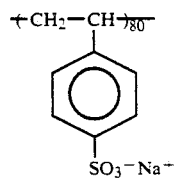   (P-9)

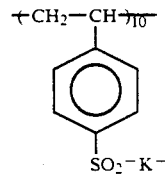

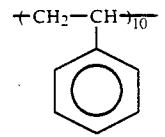

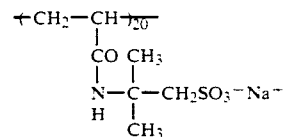   (P-10)

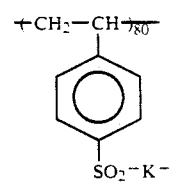

The above-described water-soluble polymers can be employed only or in combination of two or more kinds. Further, they can be employed in combination with other water-soluble polymers not having a sulfinyl group for the purpose of adjusting the viscosity of the aqueous medium or improving the dispersibility of the hydrophobic material by utilizing the function as a protective colloid.

In the case of preparing a dispersion using only the water-soluble polymer having a sulfinyl group (two or more kinds of the polymers may be included), the polymer is preferably employed in the form of an approx. 0.1–20 % aqueous solution for the purpose of increasing a viscosity of the aqueous medium (aqueous phase). Therefore, the molecular weight of the polymer is preferably in the range of 20,000 to 2,000,000, more preferably in the range of 100,000 to 1,500,000. In this case (i.e., case of using only the water soluble polymer having a sulfinyl group), x in the formula (I) which indicates copolymerization ratio of the ethylenically unsaturated monomer having a sulfinyl group is preferably in the range of 0.1 to 50 mol %, (y is in the range of 50 to 99.9%) more preferably in the range of 5 to 40 mol %.

In the case of preparing a dispersion using the water-soluble polymer having a sulfinyl group in combination with other water-soluble polymer not having a sulfinyl group, the water-soluble polymer having a sulfinyl group is preferably employed in the form of an approx. 0.01–10 % aqueous solution, provided that the existence of the other water-soluble polymer not having a sulfinyl acid contributes to increase of the viscosity of the aqueous medium and to improvement of the dispersibility. In this case, accordingly, the molecular weight of the water-soluble polymer having a sulfinyl group can be made smaller than that in the above-mentioned case of using only the water-soluble polymer having a sulfinyl group. That is, the molecular weight thereof in this case is preferably in the range of 5,000 to 1,000,000, more preferably in the range of 10,000 to 500,000. In this case, x in the formula (I) which indicates copolymerization ratio of the ethylenically unsaturated monomer having a sulfinyl group is preferably in the range of 10 to 100 mol % (y is in the range of 0 to 90 mol%), more preferably in the range of 40 to 100 mol %.

Examples of the water-soluble polymers not having a sulfinyl group which can be preferably employed in the invention in combination with the water-soluble polymer having a sulfinyl group include polyvinyl alcohol, anionmodified polyvinyl alcohol, hydroxyethyl cellulose, methyl cellulose, carboxymethyl cellulose, polyvinyl pyrrolidone, sodium polyacrylate, sulfonated polystyrene, ethylenesodium maleate copolymer, isobutylene-sodium maleate copolymer, polyacrylamide, sodium polyvinylbenzenesulfonate, pectin and gelatin. Most preferably employed is sodium polyvinylbenzenesulfonate and polyvinyl pyrrolidone.

The amount of the sulfinyl group of the water-soluble polymer contained in the aqueous medium is preferably in the range of 0.1 to 100 mol %, more preferably 0.5 to 20 mol %, based on the amount of the ethylenically unsaturated group of the compound contained in the hydrophobic material.

Examples of the compounds having an ethylenically unsaturated group contained in the hydrophobic material which can be employed in the invention include acrylic esters, methacrylic esters, itaconic mono- or di-esters, acrylamides, methacrylamides, styrene derivatives, N-vinyl compounds and vinyl ketones. Preferably employed are acrylic esters.

Preferred examples of the acrylic esters include n-butyl acrylate, cyclohexyl acrylate, 2-ethylhexyl acrylate, benzyl acrylate, furfuryl acrylate, diacrylate of ethylene oxide addition product of cyclohexanediol, nonylphenyloxyethyl acrylate, 1,6-hexanediol diacrylate, neopentyl glycol diacrylate, diacrylate of ethylene oxide addition product of bisphenol A, diacrylate of trimethylolpropane addition product of hydroxypivalyl aldehyde (R-604: trade name of Nippon Kayaku Co., Ltd.), trimethylolpropane triacrylate, diacrylate of propylene oxide addition product of trimethylolpropane, pentaerythritol triacrylate, pentaerythritol tetracrylate, dipentaerythritol hexacrylate, ditrimethylolpropane tetracrylate and trimethylolpropane diacrylate monobenzoate.

The hydrophobic material employable in the invention may contain a hydrophobic compound not having an ethylenically unsaturated group in addition to the above-mentioned compound having an ethylenically unsaturated group. In this case, the compound having an ethylenically unsaturated group is preferably contained in the hydrophobic material in an amount of not less than 10 wt.% (more preferably, not less than 40 wt.%) of the whole amount of the hydrophobic material.

As examples of the hydrophobic compounds not having an ethylenically unsaturated group, there can be mentioned natural oils such as mineral oils, animal oils and vegetable oils and, synthetic oils. Examples of the mineral oils include petroleum and petroleum fraction such as kerosine, gasoline, naphtha and paraffinic oil. Examples of the animal oils include fish oil and lard oil. Examples of the vegetable oils include peanut oil, linseed oil, soybean oil, castor oil and corn oil. Examples of the synthetic oils include biphenyl compounds (e.g., isopropyl biphenyl and isoamyl biphenyl), terphenyl compounds as described in West German Patent Provisional Publication No. 2,153,635, phosphoric acid compounds (e.g., triphenyl phosphate), naphthalene compounds as described in West German Patent Provisional Publication No. 2,141,194, methane compounds as described in West German Patent Provisional Publication No. 2,153,634, phthalic acid compounds, (e.g., diethyl phthalate, dibutyl phthalate and dioctyl phthalate) and salicylic acid compounds (e.g., ethyl salicylate).

The mixture of the compound having an ethylenically unsaturated group and the hydrophobic compound not having an ethylenically unsaturated group such as natural oils (e.g., mineral oils, animal oils and vegetable oils) or synthetic oils may optionally contain other additives such as agricultural chemicals, pharmaceuticals, aromatics, synthetic chemicals, adhesives, liquid crystals, detergents, dyes, dye precursors, developer, catalysts and antirust agents according to the purpose.

The dispersion prepared as above can be advantageously employed for the preparation of microcapsules. A process for preparing microcapsules using the dispersion is generally carried out under heating at a temperature ranging from 40° to 90° C., and the oily droplets contained in the dispersion hardly coalesce with each other even under such heating, whereby the oily droplets can be kept in the initial shape and encapsulated easily to prepare microcapsules.

There is no specific limitation on the process for preparing microcapsules employable in the invention, and various known processes can be utilized.

Examples of the processes for preparing microcapsules include a process utilizing coacervation of hydrophilic wall-forming materials as described in U.S. Pat. Nos. 2,800,457 and No. 2,800,458; an interfacial polymerization process as described in U.S. Pat. No. 3,287,154, U.K. Pat. No. 990,443 and Japanese Patent Publications No. 38(1963)-19574, No. 42(1967)-446 and No. 42(1967)-771; a process utilizing precipitation of polymers as described in U.S. Pat. Nos. 3,418,250 and No. 3,660,304; a process of using isocyanate-polyol wall materials as described in U.S. Pat. No. 3,796,669; a process of using isocyanate wall materials as described in U.S. Pat. No. 3,914,511; a process of using urea-formaldehyde or urea-formaldehyderesorcinol wall-forming materials as described in U.S. Pat. Nos. 4,001,140, No. 4,087,376 and 4,089,802; a process of using melamine-formaldehyde resins, hydroxypropyl cellulose or like wall-forming materials as described in U.S. Pat. No. 4,025,455; an in situ process utilizing polymerization of monomers as described in Japanese Patent Publication No. 36(1961)-9168 and Japanese Patent Provisional Publication No. 51(1976)-9079; an polymerization-dispersion cooling process as described in British Patent Nos., 927,807 and 965,074; and a spray-drying process as described in U.S. Pat. No. 3,111,407 and U.K. Pat. No. 930,422.

In the invention, the process of using melamine-formaldehyde resins is preferred.

The microcapsule of the invention can be favorably employed for preparing pressure sensitive, heat-sensitive materials or light-sensitive materials.

The examples of the present invention and the comparison examples are given below, but the examples are construed by no means to restrict the invention.

EXAMPLE 1

To 52.32 g of a distilled water was added 6.24 g of sodium polyvinylbenzenesulfonate, and they were mixed under heating at a temperature of 60° C. To the resulting solution was added 1.6 g of a 15 % aqueous solution of the following potassium polyvinylbenzenesulfinate (P-2), and the obtained solution was adjusted to pH 6.0 using a 20 % aqueous solution of phosphoric acid.

To the obtained aqueous solution was added 27.0 g of an oily liquid of the following compound having an ethylenically unsaturated group (diacrylate of an addition product of 2,2-dimethyl-3-hydroxypropioaldehyde with trimethylolpropane, R-604: trade name of Nippon Kayaku Industry Ltd.), and the mixture was stirred at 2,000 r.p.m. for 20 minutes using a homogenizer, to prepare a dispersion of oily droplets (Dispersion A), each droplet having a thin film, according to the invention.

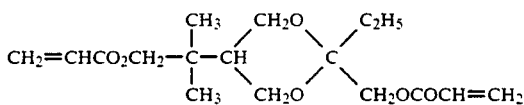

(Compound having ethylenically unsaturated group)

EXAMPLE 2

The procedures of Example 1 were repeated except for using as the aqueous solution a solution prepared by dissolving 6.88 g of the following sodium vinylbenzenesulfonate/potassium vinylbenzenesulfinate copolymer (P-3) in 55.50 g of a distilled water, followed by adjusting pH of the resulting solution to 6.0, to prepare a dispersion of oily droplets (Dispersion B), each droplet having a thin film, according to the invention.

-continued

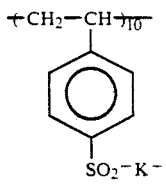

EXAMPLE 3

The procedures of Example 1 were repeated except for using as the aqueous solution a solution prepared by dissolving 3.13 g of polyvinyl pyrrolidone (K-90: trade name of Wako Junyaku Industry Ltd.) in 59.41 g of a distilled water under stirring and adding 3.84 g of a 15 % aqueous solution of the above-mentioned potassium polyvinylbenzenesulfinate (P-2), followed by adjusting pH of the resulting solution to 6.0, to prepare a dispersion of oily droplets (Dispersion C), each droplet having a thin film, according to the invention.

EXAMPLE 4

The procedures of Example 1 were repeated except for using as the aqueous solution a solution prepared by dissolving 6.24 g of sodium polyvinylbenzenesulfonate in 50.06 g of a distilled water under stirring at 60° C. and adding 6.10 g of the 10 % aqueous solution of the following methylmethacrylate/potassium vinylbenzenesulfinate copolymer (P-7), followed by adjusting pH of the resulting solution to 6.0, to prepare a dispersion of oily droplets (Dispersion D), each droplet having a thin film, according to the invention.

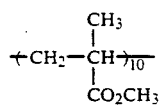

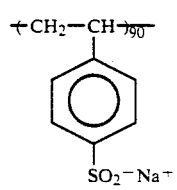

COMPARISON EXAMPLE 1

The procedures of Example 1 were repeated except for using 62.4 g of a 10 % aqueous solution of sodium polyvinylbenzenesulfonate as the aqueous solution, to prepare a dispersion of oily droplets (Dispersion E), each droplet not having a thin film, for comparison.

COMPARISON EXAMPLE 2

The procedures of Example 1 were repeated except for using 66.4 g of a 4.7 % aqueous solution of polyvinyl pyrrolidone as the aqueous solution, to prepare a dispersion of oily droplets (Dispersion F), each droplet not having a thin film, for comparison.

Evaluation of Dispersion

Each of the above-obtained dispersions (Dispersions A to F) was heated at 60° C. for 30 minutes under stirring, and the mean droplet diameter by volume of the oily droplets contained in the dispersion and the standard deviation thereof were measured using a coulter counter, to evaluate the dispersion on the dispersed state of the oily droplets contained therein.

The results are set forth in Table 1, in which the mean droplet diameter by volume of the oily droplets and the standard deviation thereof measured prior to the heating with respect to each dispersion are also set forth.

TABLE 1

| | | Before Heating | | After Heating | |
|---|---|---|---|---|---|
| Dispersion | Water-soluble Polymer | Mean Diameter ($\mu$m) | Standard Deviation ($\mu$m) | Mean Diameter ($\mu$m) | Standard Deviation ($\mu$m) |
| A | Sodium polyvinyl-benzenesulfonate & (P-2) | 5.3 | 3.2 | 4.9 | 3.3 |
| B | (P-3) | 6.8 | 4.9 | 7.2 | 5.0 |
| C | Polyvinyl pyrrolidone & (P-2) | 12.1 | 7.1 | 13.0 | 7.6 |
| D | Sodium polyvinyl-benzenesulfonate & (P-7) | 10.4 | 6.2 | 11.0 | 5.9 |
| E | Sodium polyvinyl-benzenesulfonate | 13.1 | 5.1 | 36.7 | 11.0 |
| F | Polyvinyl pyrrolidone | 16.5 | 13.0 | 39.2 | 12.5 |

As is evident from the results set forth in Table 1, in the dispersions containing a water-soluble polymer having a sulfinyl group according to the invention (i.e., Dispersions A, C and D prepared using a water-soluble polymer having a sulfinyl group in combination with other water-soluble polymer, or Dispersion B prepared using a water-soluble polymer only), the oily droplets having a thin film were hardly ruptured or hardly coalesced with each other even when heated, that is, the dispersions showed high stability even when heated.

On the other hand, it was confirmed that the oily droplets in the dispersions prepared in the comparison examples (Dispersions E and F) increased in their droplet diameters after heating of the dispersions, that is, the oily droplets coalesced with each other. Also confirmed was that the oil of the oily droplets partially separated from the droplets through heating.

EXAMPLE 5

Preparation of dispersion

To 900 g of a distilled water was added 100 g of sodium polyvinylbenzenesulfonate, and they were stirred under heating at 70° C. The resulting solution was cooled to room temperature. To the solution was then added 61.5 g of a 15 % aqueous solution of the above-mentioned potassium polyvinylbenzenesulfinate (P-2), and the obtained solution was adjusted to pH 6.0 using a 20 % aqueous solution of phosphoric acid, to obtain 132.2 g of an aqueous solution.

Subsequently, to the obtained aqueous solution was added an oily liquid prepared by dissolving 9.0 g of Pargascript Red I-6-B (trade name of Ciba-Geigy) and 0.67 g of 1,1'-azobis (cyclohexane-1-carbonitrile, thermal polymerization initiator, trade name: V-40, available from Wako Junyaku Industry Ltd.) in a mixture of 37.0 g of trimethylolpropane triacrylate (trade name: M-309, available from Toa Synthetic Chemicals Industry Ltd.) and 8.0 g of diisopropyl naphthalene, and the resulting mixture was stirred at 3,000 r.p.m. for 20 minutes using a homogenizer, to prepare a dispersion of oily droplets (Dispersion G), each droplet having a thin film, according to the invention.

Preparation of microcapsule-dispersion

To 35.8 g of the above-obtained dispersion (Dispersion G) was added 3.87 g of a 20 % aqueous solution of acryloyl morpholine, and the resulting mixture was adjusted to pH 6.0 using a 20 % aqueous solution of phosphoric acid. Then the mixture was heated at 60° C. for 10 minutes under stirring.

Independently, to 41.9 g of a distilled water were added 7.8 g of melamine and 12.8 g of formalin, and they were heated at 60° C. for 30 minutes under stirring to obtain a melamine-formalin precondensate.

Then, 10.3 g of the melamine-formalin precondensate was added to the above mixture, and the resulting mixture was again adjusted to pH 6.0 using a 20 % aqueous solution of phosphoric acid. The mixture was then heated at 60° C. for 90 minutes under stirring, to prepare a dispersion of microcapsules (Microcapsule-dispersion H), each microcapsule having a melamine-formaldehyde resin wall.

Evaluation of Dispersion and Microcapsule-dispersion

The above-obtained dispersion (Dispersion G) and microcapsule dispersion (Microcapsule-dispersion H) were measured on the mean droplet (or microcapsule) diameter by volume and the standard deviation using a coulter counter.

The results are set forth in the following table.

|  | Mean Diameter ($\mu$m) | Standard Deviation ($\mu$m) |
|---|---|---|
| Dispersion G | 8.1 | 4.1 |
| Microcapsule-dispersion H | 8.6 | 4.7 |

As is evident from the results, the oily droplets were encapsulated keeping the initial size in Dispersion G prepared by the process of the invention even when heated at 60° C. for encapsulation.

Preparation of pressure-sensitive, heat-sensitive material

To 30.3 g of the above-obtained Microcapsule-dispersion H were added 29.7 g of a distilled water, 4.0 g of a 5 % aqueous solution of ethylene oxide addition product of nonylphenol (trade name: Nonion NS-208, available from Nippon Oils & Fats Co., Ltd.) and 10.0 g of a 20 % aqueous dispersion of cornstarch, to prepare a coating solution for the formation of a pressure-sensitive, heat-sensitive material. The coating solution was coated over a polyethylene terephthalate film (support) having a thickness of 100 $\mu$m in an amount of 53 ml/m$^2$, and the coated layer of the solution was dried at 40° C. for one hour, to prepare a pressure-sensitive, heat-sensitive material.

Evaluation of Pressure-sensitive, heat-sensitive Material

Preparation of image-receiving material

To 125 g of a distilled water was added 11 g of a 40 % aqueous solution of sodium hexametaphosphate, and were further added 34 g of zinc 3,5-di-α-methylbenzyl-salicylate and 82 g of a 55 % slurry of calcium carbonate, followed by coarsely dispersing in a mixer. The coarse dispersion was then finely dispersed in Dynomill dispersing device. To 200 g of the resulting dispersion were added 6 g of 50 % latex of SBR (styrene-butadiene rubber) and 55 g of an 8 % aqueous solution of polyvinyl alcohol, and the resulting mixture was made uniform. The mixture was then evenly coated on a paper having basis weight of 43 g/m$^2$ to give a layer having a wet thickness of 30 $\mu$m, and dried to obtain an image-receiving material.

The pressure-sensitive, heat-sensitive material obtained above was used as four samples; that is, one was allowed to stand at room temperature (25° C., namely not heated) and other three samples were heated at 100°, 120° and 140° C., respectively, for 20 seconds on a hot plate. Each of the samples was then combined with the above-obtained image-receiving material and passed through a press roller at a pressure of 500 kg/cm$^2$ to obtain a magenta image on the image-receiving material. The density of the obtained magenta image was measured using Macbeth reflection densitometer.

The results are set forth in the following table.

| Temperature (°C.) | 25 | 100 | 120 | 140 |
|---|---|---|---|---|
| Density of Magenta Image | 1.26 | 1.24 | 1.25 | 0.11 |

As is evident from the results, it was confirmed that the pressure-sensitive, heat-sensitive material prepared using microcapsules of the present invention showed satisfactory color formation at a temperature ranging from room temperature to 120° C. Also confirmed was that the color formation was restrained at a temperature of higher than 140° C.

EXAMPLE 6

Preparation of dispersion

To 124.5 g of a 10 % aqueous solution of sodium polyvinylbenzenesulfonate was added 7.7 g of a 15 % aqueous solution of the above-mentioned potassium polyvinylbenzenesulfinate (P-2), and the obtained solution was adjusted to pH 6.0 using a 20 % aqueous solution of phosphoric acid, to obtain 132.2 g of an aqueous solution.

Independently, 3.53 g of Irgacure-651 (trade name of Ciba-Geigy, photopolymerization initiator) was dissolved in 54 g of a solution obtained by dissolving 20 g of Pargascript Red 1-6-B in 100 g of the above-mentioned diacrylate of addition product of 2,2-dimethyl-3-hydroxypropioaldehyde with trimethylolpropane, to prepare an oily liquid.

The oily liquid was added to the above-obtained aqueous solution, and the resulting mixture was stirred at 3,000 r.p.m. for 20 minutes at 35° C. using a homogenizer, to prepare an oily dispersion of oily droplets (Dispersion I), each droplet having a thin film, according to the invention.

Preparation of microcapsule-dispersion

To 385 g of a distilled water were added 71.3 g of melamine and 118 g of formalin, and the resulting mixture was heated at 60° C. for 30 minutes under stirring to obtain a melamine-formalin precondensate. 77.1 g of the melamine-formalin precondensate was added to the above-obtained dispersion (Dispersion I), and the resulting mixture was again adjusted to pH 6.0 using a 20 % aqueous solution of phosphoric acid. The mixture was then heated at 60° C. for 90 minutes under stirring, to prepare a dispersion of microcapsules (Microcapsule-dispersion J), each microcapsule having a melamine-formaldehyde resin wall.

Evaluation of Dispersion and Microcapsule-dispersion

The above-obtained dispersion (Dispersion I) and microcapsule-dispersion (Microcapsule-dispersion J) were measured on the mean droplet (or microcapsule) diameter by volume and the standard deviation using a coulter counter in the same manner as described in Example 5.

The results are set forth in the following table.

|  | Mean Diameter ($\mu$m) | Standard Deviation ($\mu$m) |
| --- | --- | --- |
| Dispersion I | 8.3 | 5.5 |
| Microcapsule-dispersion J | 8.7 | 6.0 |

As is evident from the results, the oily droplets were encapsulated keeping the initial size in Dispersion I prepared by the process of the invention, even when heated at 60° C. for encapsulation.

Preparation of light-sensitive material

To 34.3 g of the above-obtained microcapsule-dispersion (Microcapsule-dispersion J) were added 25.7 g of a distilled water, 4.0 g of a 5 % aqueous solution of ethyleneoxide addition product of nonylphenol (trade name: Nonion NS-208.5, available from Nippon Oils and Fats Co., Ltd.) and 10.0 g of a 20 % aqueous dispersion of cornstarch, to prepare a coating solution for the formation of a light-sensitive material.

The coating solution was coated over a polyethylene terephthalate film having a thickness of 100 $\mu$m in an amount of 53 ml/m$^2$, and the coated layer of the solution was dried at 60° C. to prepare a light-sensitive material.

Evaluation of Light-sensitive Material

The light-sensitive material obtained above was exposed to light for 10 seconds using a high-pressure mercury lamp of 1 kw at a distance of 50 cm through step filters having a density difference of 0.15. Then, the light-sensitive material was combined with the above-obtained image-receiving material, and they were passed through a press roller at a pressure of 500 kg/cm$^2$ to obtain a magenta image on the image-receiving material. The magenta image was measured on the maximum density and the minimum density using Macbeth reflection densitometer.

The results are set forth in the following table.

| Maximum Density | Minimum Density |
| --- | --- |
| 1.37 | 0.09 |

As is evident from the results, in the light-sensitive material using microcapsules prepared by the present invention, the color formation was sufficiently restrained on the portions which were exposed to light, while high density was obtained on other portions which were hardly exposed to light (the portions exposed to light filtered by the filters of step 8 or more, namely, the portions exposed to light having light amount of 0.0625).

We claim:

1. A process for preparing oily droplets comprising dispersing a hydrophobic material containing a compound having an ethylenically unsaturated group in the form of oily droplets in an aqueous medium containing a water-soluble polymer having a sulfinyl group to form a film around the oily droplet, wherein said film is a reaction product between the compound having an ethylenically unsaturated group and the water-soluble polymer having a sulfinyl group; and, after said reaction, compound containing unreacted ethylenically unsaturated group remains inside the oily droplet.

2. The process as claimed in claim 1, wherein the water-soluble polymer having a sulfinyl group has the following formula, provided that polymer having a sulfinyl group is contained in the aqueous medium singly:

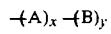

in which A is a repeated unit derived from an ethylenically unsaturated monomer having a sulfinyl group; B is a repeated unit derived from an ethylenically unsaturated monomer not having a sulfinyl group; and x is in the range of 0.1 to 50 mol %; and y is in the range of 50 to 99.9 mol %.

3. The process as claimed in claim 1, wherein the water-soluble polymer having a sulfinyl group has the following formula, provided that polymer having a sulfinyl group is contained in the aqueous medium in combination with a water-soluble polymer not having a sulfinyl group:

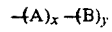

in which A is a repeated unit derived from an ethylenically unsaturated monomer having a sulfinyl group; B is a repeated unit derived from an ethylenically unsaturated monomer not having a sulfinyl group; and x is in the range of 10 to 100 mol %; and y is in the range of 0 to 90 mol %.

4. The process as claimed in claim 1, wherein the sulfinyl group of the water-soluble polymer is contained in the aqueous medium in an amount of 0.1 to 100 mol % based on the amount of the ethylenically unsaturated group of the compound having an ethylenically unsaturated group contained in the hydrophobic material.

5. The process as claimed in claim 1, wherein the aqueous medium further contains sodium polyvinylbenzenesulfonate as a water-soluble polymer not having a sulfinyl group.

6. A process for preparing microcapsules comprising the steps of dispersing a hydrophobic material having an ethylenically unsaturated group in the form of oily droplets in an aqueous medium containing a water-soluble polymer having a sulfinyl group to form a film around the oily droplet, wherein said film is a reaction product between the compound having an ethylenically unsaturated group and the water-soluble polymer having a sulfinyl group and, after said reaction, compound containing unreacted ethylenically unsaturated group remains inside the oily droplet; and forming a resin wall.

7. The process as claimed in claim 6, wherein the water-soluble polymer having a sulfinyl group has the following formula, provided that polymer having sulfinyl group is contained in the aqueous medium singly:

$$-(A)_x-(B)_y-$$

in which A is a repeated unit derived from an ethylenically unsaturated monomer having a sulfinyl group; B is a repeated unit derived from an ethylenically unsaturated monomer not having a sulfinyl group; and x is in the range of 0.1 to 50 mol %; and y is in the range of 50 to 99.9 mol %.

8. The process as claimed in claim 6, wherein the water-soluble polymer having a sulfinyl group has the following formula, provided that polymer having a sulfinyl group is contained in the aqueous medium in combination with a water-soluble polymer not having a sulfinyl group:

$$-(A)_x-(B)_y-$$

in which A is a repeated unit derived from an ethylenically unsaturated monomer having a sulfinyl group; B is a repeated unit derived from an ethylenically unsaturated monomer not having a sulfinyl group; and x is in the range of 10 to 100 mol %; and y is in the range of 0 to 90 mol %.

9. The process as claimed in claim 6, wherein the sulfinyl group of the water-soluble polymer is contained in the aqueous medium in an amount of 0.1 to 100 mol % based on the amount of the ethylenically unsaturated group of the compound having an ethylenically unsaturated group contained in the hydrophobic material.

10. The process as claimed in claim 6, wherein the aqueous medium further contains sodium polyvinylbenzenesulfonate as a water-soluble polymer not having a sulfinyl group.

11. The process as claimed in claim 6, wherein the process is carried out under heating.

12. The process as claimed in claim 6, wherein the process is carried out under heating and the temperature for the heating is in the range of 40° to 90° C.

* * * * *